(12) United States Patent
Slesinski et al.

(10) Patent No.: US 11,339,691 B2
(45) Date of Patent: May 24, 2022

(54) HEAT TRANSFER SYSTEM

(71) Applicant: Dana Heavy Vehicle Systems Group, LLC, Maumee, OH (US)

(72) Inventors: Steven G. Slesinski, Ann Arbor, MI (US); Harry W. Trost, Royal Oak, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 32 days.

(21) Appl. No.: 16/921,697

(22) Filed: Jul. 6, 2020

(65) Prior Publication Data

US 2020/0340376 A1    Oct. 29, 2020

Related U.S. Application Data

(62) Division of application No. 15/803,152, filed on Nov. 3, 2017, now Pat. No. 10,738,667.

(51) Int. Cl.

| F01M 5/00 | (2006.01) |
|---|---|
| F16H 57/04 | (2010.01) |
| F16H 48/38 | (2012.01) |
| F01M 11/00 | (2006.01) |

(52) U.S. Cl.
CPC ............. *F01M 5/001* (2013.01); *F16H 48/38* (2013.01); *F16H 57/0409* (2013.01); *F16H 57/0417* (2013.01); *F16H 57/0457* (2013.01); *F16H 57/0483* (2013.01); *F01M 2011/0025* (2013.01)

(58) Field of Classification Search
CPC .......... F01M 5/001; F01M 5/00; F01M 5/002; F01M 2011/0025; F16H 48/38; F16H 57/0409; F16H 57/0417; F16H 57/0457; F16H 57/0483; F16H 57/0415; H01M 10/613; H01M 10/66; H01M 10/625
See application file for complete search history.

(56) References Cited

U.S. PATENT DOCUMENTS

| 2,368,963 A | * | 2/1945 | Boden | F16C 19/548 |
|---|---|---|---|---|
| | | | | 184/11.1 |
| 3,788,426 A | * | 1/1974 | Hull, Jr. | F16H 57/0415 |
| | | | | 184/109 |
| 3,970,816 A | * | 7/1976 | Hosokawa | F01M 5/021 |
| | | | | 219/205 |
| 4,480,493 A | * | 11/1984 | Takahashi | F16H 57/0494 |
| | | | | 184/6.12 |
| 5,017,758 A | * | 5/1991 | Kirkman | F01M 5/021 |
| | | | | 123/142.5 E |
| 5,232,291 A | * | 8/1993 | Kuan | F16C 33/6651 |
| | | | | 384/473 |
| 5,247,158 A | * | 9/1993 | Steinhauser | H05B 3/46 |
| | | | | 219/534 |

(Continued)

FOREIGN PATENT DOCUMENTS

| CN | 202040516 U | 11/2011 |
|---|---|---|
| CN | 105889478 A | 8/2016 |

(Continued)

*Primary Examiner* — Michael A Riegelman
(74) *Attorney, Agent, or Firm* — McCoy Russell LLP (57) ABSTRACT

A heat transfer system for a vehicle including an axle assembly having a carrier housing. A sump defined by the carrier housing contains a fluid lubricant. The heat transfer system further includes a heat exchanger within the sump. The heat exchanger is in fluid communication with a battery cooling unit.

20 Claims, 7 Drawing Sheets

(56) References Cited

U.S. PATENT DOCUMENTS

| | | | | |
|---|---|---|---|---|
| 5,931,218 A * | 8/1999 | Carlson | F28D 7/005 | 165/47 |
| 6,092,628 A * | 7/2000 | Hinton | F16H 57/0412 | 184/104.1 |
| 6,398,687 B2 * | 6/2002 | Iwata | F16H 57/0457 | 475/160 |
| 6,499,565 B1 * | 12/2002 | Coyle | F16H 57/0412 | 184/6.12 |
| 6,830,096 B1 * | 12/2004 | Fett | F16H 57/0412 | 165/104.21 |
| 7,357,203 B2 * | 4/2008 | Morrow | B60K 6/40 | 180/65.1 |
| 7,445,574 B2 * | 11/2008 | Weith | F16H 57/0483 | 475/160 |
| 7,862,714 B2 * | 1/2011 | Brejnbjerg | B01D 35/18 | 210/180 |
| 8,353,265 B2 * | 1/2013 | Pursifull | F01M 5/001 | 123/142.5 R |
| 8,469,852 B2 * | 6/2013 | Gianone | F16H 57/0447 | 475/160 |
| 8,485,932 B2 * | 7/2013 | Beechie | B60H 1/00478 | 475/161 |
| 8,512,193 B1 * | 8/2013 | Hilker | F16H 57/0483 | 475/160 |
| 8,528,697 B2 * | 9/2013 | Mordukhovich | F16H 57/0413 | 184/6.12 |
| 8,579,088 B2 * | 11/2013 | Martin, III | F16H 57/0447 | 184/6.12 |
| 8,746,405 B2 * | 6/2014 | Perakes | F16H 57/0409 | 184/6.12 |
| 8,821,332 B2 * | 9/2014 | Kawamura | F16H 57/0426 | 475/160 |
| 9,052,009 B2 * | 6/2015 | Barillot | F16H 57/0409 | |
| 9,284,995 B2 * | 3/2016 | Lawson | F16D 27/118 | |
| 9,360,104 B1 * | 6/2016 | Lippert | F16H 57/0475 | |
| 9,453,690 B2 * | 9/2016 | Martin | F28D 1/0333 | |
| 11,226,053 B2 * | 1/2022 | Noboa | F16K 37/0091 | |
| 2004/0149519 A1 * | 8/2004 | Slesinski | F16H 57/0483 | 184/6.25 |
| 2006/0117906 A1 * | 6/2006 | Petruska | F16H 57/0483 | 74/607 |
| 2010/0038174 A1 * | 2/2010 | Mordukhovich | F16H 57/0413 | 184/6.12 |
| 2012/0085512 A1 * | 4/2012 | Graaf | B60L 58/26 | 165/51 |
| 2012/0118100 A1 * | 5/2012 | Mordukhovich | C10M 171/005 | 74/607 |
| 2012/0297805 A1 * | 11/2012 | Kamada | F25B 5/02 | 62/208 |
| 2013/0296095 A1 * | 11/2013 | Kwasniewski | F16H 57/045 | 475/160 |
| 2014/0069230 A1 * | 3/2014 | Trost | F16H 57/0457 | 74/607 |
| 2014/0116807 A1 * | 5/2014 | Paielli | F16H 57/0447 | 184/6.12 |
| 2014/0209280 A1 * | 7/2014 | Goenka | F28D 15/0266 | 165/104.14 |
| 2014/0290922 A1 * | 10/2014 | Palanchon | F01M 5/002 | 165/168 |
| 2015/0219206 A1 * | 8/2015 | Trost | F16H 57/0483 | 475/160 |
| 2017/0138651 A1 * | 5/2017 | Haussmann | F25B 40/06 | |
| 2017/0211684 A1 * | 7/2017 | Kopp | F16H 57/0413 | |
| 2018/0123197 A1 * | 5/2018 | Liptak | B60L 50/64 | |
| 2018/0229584 A1 * | 8/2018 | Cosgrove | B60H 1/3211 | |
| 2018/0372209 A1 * | 12/2018 | Carmean | F16H 57/037 | |
| 2019/0136726 A1 * | 5/2019 | Slesinski | F16H 57/0409 | |

FOREIGN PATENT DOCUMENTS

| | | |
|---|---|---|
| DE | 102008020646 A1 | 10/2009 |
| JP | 2012159173 A | 8/2012 |

* cited by examiner

HEAT TRANSFER SYSTEM

CROSS-REFERENCE TO RELATED APPLICATION

The present application is a divisional of U.S. patent application Ser. No. 15/803,152, entitled "HEAT TRANSFER SYSTEM", and filed on Nov. 3, 2017. The entire contents of the above-listed application are hereby incorporated by reference for all purposes.

BACKGROUND

The present disclosure relates to power transmission components and heat transfer systems. Axle assemblies in wheeled vehicle drivetrains are known to employ a differential apparatus to permit an outer drive wheel to rotate at a greater velocity than an inner drive wheel when operating a vehicle through a turn. Differential apparatuses employ a pinion gear drivingly engaged with a ring gear, which in turn rotates a differential case having a number of bevel gears engaged with a pair of side gears, the side gears being coupled with a pair of axles. The differential apparatus is located within a carrier housing of the axle assembly. Conventionally, a sump in the carrier housing contains lubricant to reduce friction between surfaces including, but not limited to, the pinion gear and ring gear, and the pair of side gears and the bevel gears.

In conventional axle assemblies, the lubricant causes parasitic drag that is exaggerated when the ambient temperature of the carrier housing is reduced below typical summer operating temperatures, such as during operation in cold weather. Lubricant temperature effects the viscosity of the lubricant, such that cold weather operation of an axle assembly creates an increase in vehicle fuel consumption. During a cold weather warm-up cycle of an axle assembly, the lubricant may disperse heat generated between the moving parts at a rate which prevents the viscosity of the lubricant from decreasing for several hours, resulting in increased drag and fuel consumption for a prolonged period of time. Similarly, lubricant within a transmission or gear box may also cause parasitic drag that is heightened during cold weather.

Increasing the temperature of the lubricant disposed in the axle assembly and/or gear box to minimize or eliminate the duration of a warm-up cycle can reduce parasitic drag and increase fuel economy.

SUMMARY

The present disclosure provides a heat transfer system for a vehicle. In one embodiment, the heat transfer system includes an axle assembly having a carrier housing. The carrier housing defines a sump containing at least a portion of a lubricant. A heat exchanger having one or more electrically conductive elements, is at least partially disposed within the carrier housing, and is electrical connection an electrical power source.

In another embodiment, a heat transfer system for a vehicle includes an axle assembly having a carrier housing. The carrier housing defines a sump containing at least a portion of a lubricant. The heat transfer system further includes a heat exchanger at least partially disposed within the sump. The heat exchanger is in fluid communication with a battery cooling unit having a liquid coolant.

In yet another embodiment, a heat transfer system for a vehicle includes a gear box having at least one gear, and a fluid rail including a manifold and a nozzle. The heat transfer system also includes a heat exchanger having an induction coil disposed about a portion of the fluid rail. An electrical power source is in electrical connection with the heat exchanger.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
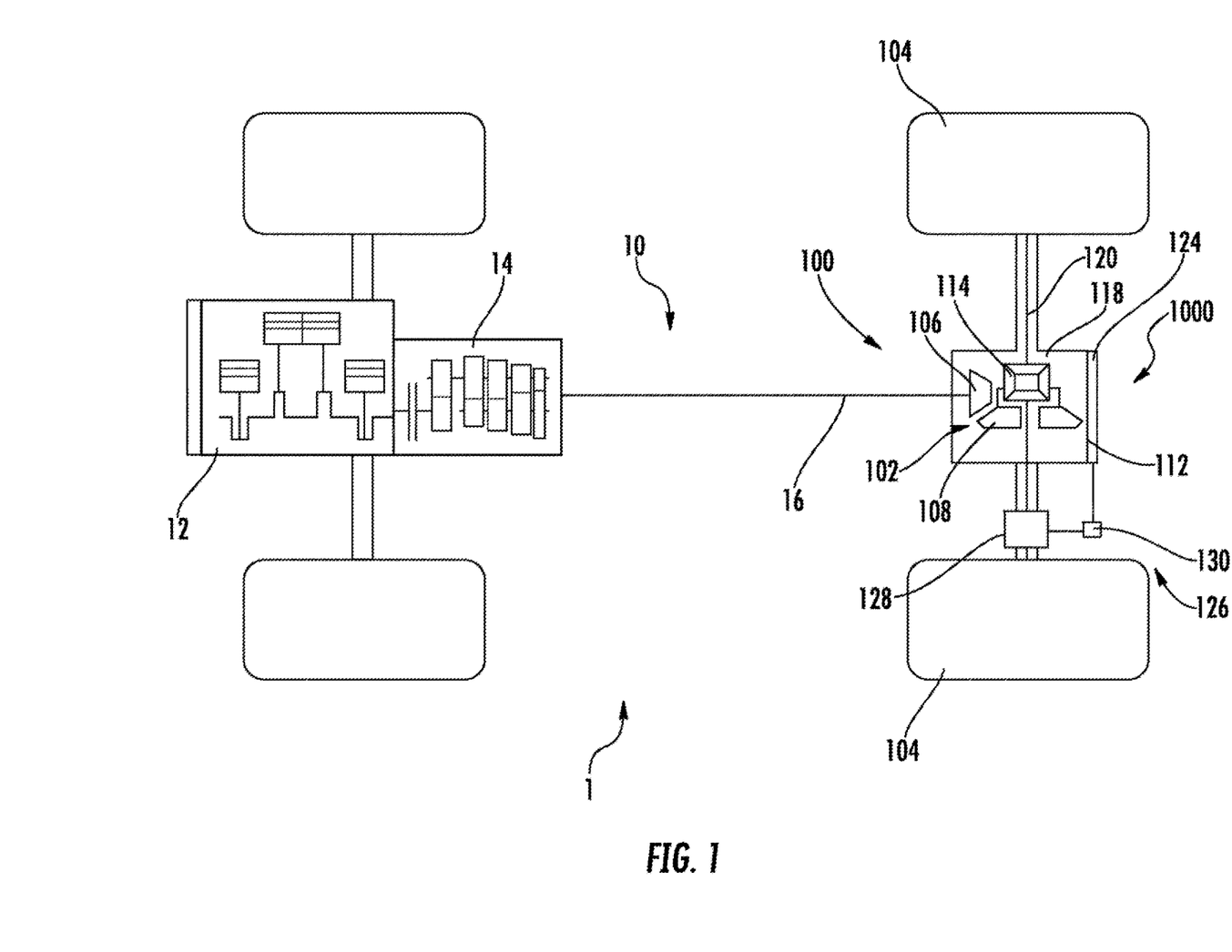
FIG. 1 is a schematic representation of a vehicle having a heat transfer system according to an embodiment of the presently disclosed subject matter.

As illustrated in FIG. 1, in an embodiment, an axle assembly 100 comprises a lubricant heating system 1000. However, the lubricant heating system 1000 is not limited to use with the axle assembly 100 described herein. Instead, the lubricant heating system 1000 may be utilized with vehicles and assemblies of other shapes, sizes, orientations, and designs.

In certain embodiments, the lubricant heating system 1000 is utilized with a vehicle 1. The lubricant heating system 1000 described herein may additionally have applications in both light duty and heavy duty vehicles, and for passenger, commercial, and off-highway vehicles. It would be understood by one of ordinary skill in the art that the lubricant heating system 1000 also has industrial, locomotive, military, agricultural, and aerospace applications.

Referring now to FIG. 1, in an embodiment, the vehicle 1 may comprise a driveline arrangement 10 having a longitudinally disposed power source 12. The power source 12 may be, but is not limited to, an internal combustion engine, an electric motor, a traction battery, or a fuel cell. The driveline arrangement 10 may include a transmission 14 having an input driveably connected to the power source 12, and an output driveably connected to a differential mechanism 102 of the axle assembly 100. The transmission 14 may also be referred to herein as a gear box. The differential mechanism 102 is driveably connected to a primary wheelset 104.

The output of the transmission 14 is coupled with a pinion shaft 16 rotatably mounted in the axle assembly 100. A pinion gear 106 is coupled with an end of the pinion shaft 16 opposite the transmission 14, and is in continuous meshed engagement with a ring gear 108 to transmit rotational drive thereto. The ring gear 108 is coupled with a differential case 110 (see FIG. 2). The differential case 110 may be fixed to the ring gear 108 via a plurality of fasteners, and rotates with the ring gear 108. The differential case 110 is mounted for rotation within a carrier housing 112 of the axle assembly 100 via a pair of differential bearings (not depicted) coupled with a pair of differential bearing caps 115.

Figure 2:
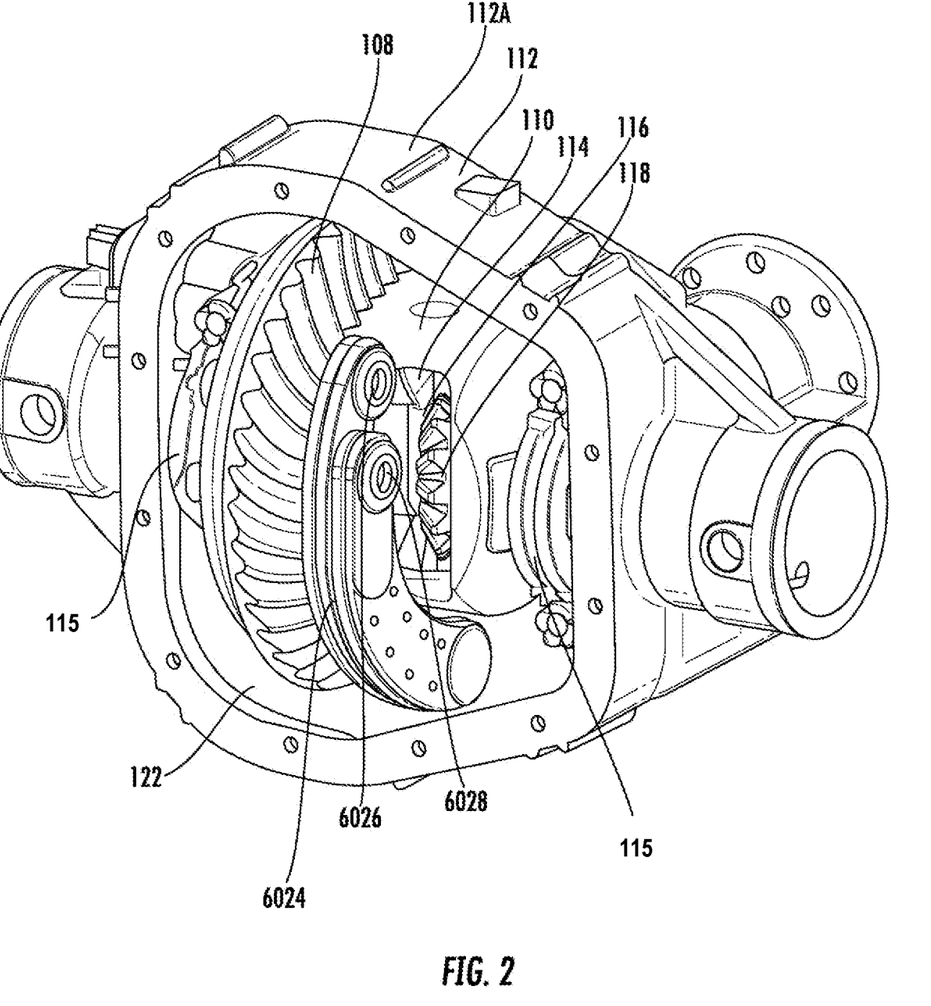
FIG. 2 is a perspective view of a portion of an axle assembly having a heat transfer system according to an embodiment of the presently disclosed subject matter.

As illustrated in FIGS. 1 and 2, the differential case 110 houses one or more pinion gears 114 mounted on at least one pinion shaft 116. The one or more differential pinion gears 114 are meshed with side gears 118 within the differential case 110. The side gears 118 comprise radially inward projecting splines which engage respective axle half shafts 120. The differential case 110 further comprises a pair of axle half shaft bores through which the axle half shafts 120 are inserted into engagement with the side gears 118. In an embodiment, the axle half shafts 120 are secured in their position in the differential case by c-clips (not depicted) inserted into grooves in the axle half shafts 120.

Referring now to FIG. 2, the carrier housing 112 comprises a forward portion 112A and a rearward portion 112B. The interior of the carrier housing forward and rearward portions 112A, 112B define a lubricant sump 122. The lubricant sump 122 holds a predetermined volume of lubricant (not depicted).

Figure 3:
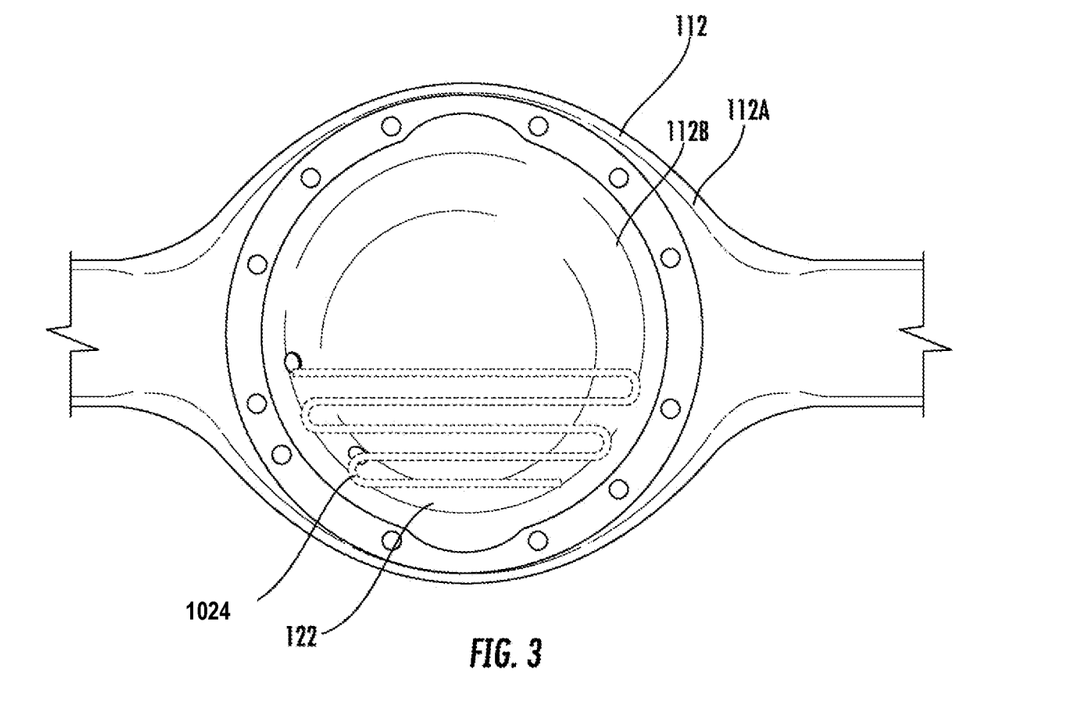
FIG. 3 is a side view of a portion an axle assembly having a heat transfer system according to another embodiment of the presently disclosed subject matter.

In an embodiment, as illustrated in FIG. 3, a heat exchanger 1024 of the lubricant heating system 1000 may be coupled with the interior of the carrier housing rearward portion 112B. The heat exchanger 1024 may comprise a heating element disposed on the carrier housing rearward portion 112B such that it is at least partially submerged within the lubricant in the sump 122. As illustrated in FIG. 3, the heating element 1024 may include a folded tubular geometry. In other embodiments, the heating element 1024 may comprise a straight or coiled geometry. The length of the heating element 1024 may be changed to increase or decrease the amount of heat transferred to the lubricant in the sump 122. The heat exchanger 1024 is coupled with a controller 1032.

Figure 4:
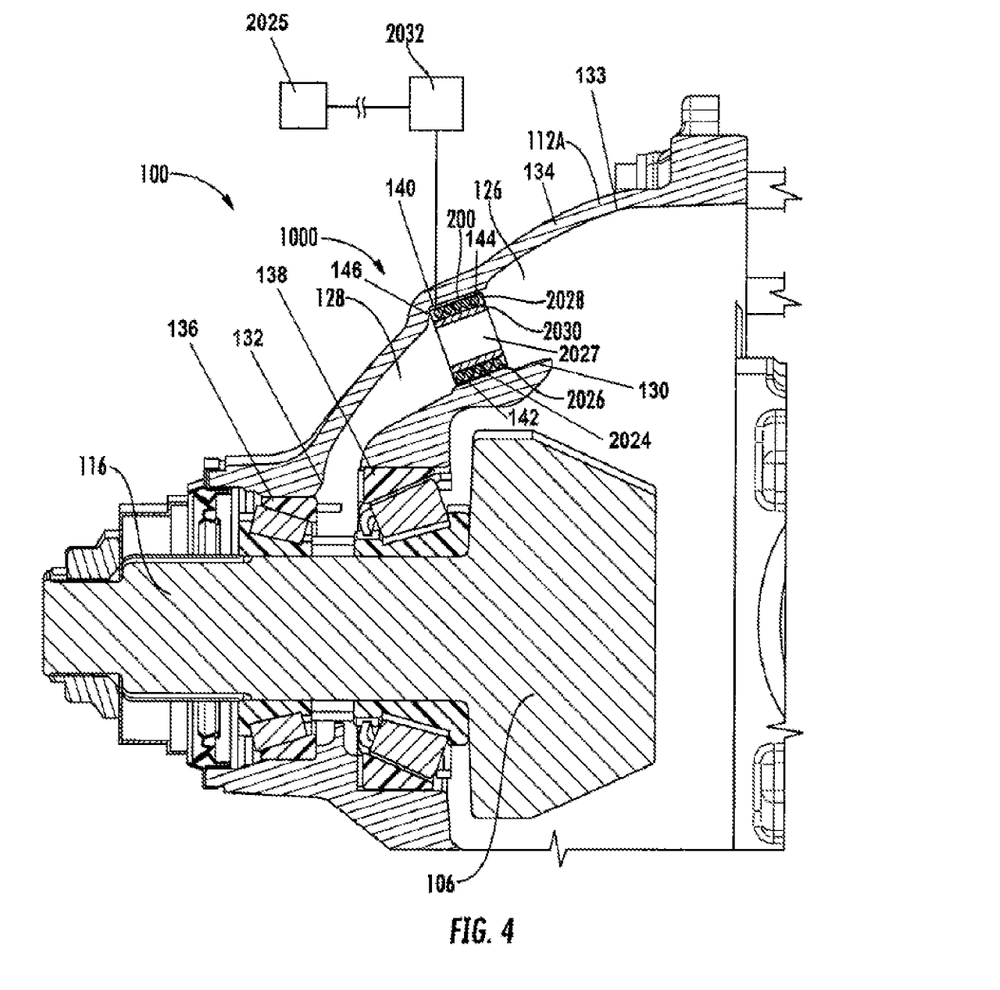
FIG. 4 is a sectional view of a portion of an axle assembly having a heat transfer system according to yet another embodiment of the presently disclosed subject matter.

As illustrated in FIG. 4, in another embodiment, a heat exchanger 2024 may be located in the lubricant flow path. The heat exchanger 2024 may be disposed in a lubricant catch 126, or in a lubricant conduit 128 in fluid communication with the lubricant catch 126. As best seen in FIG. 4 of the disclosure and as a non-limiting example, the lubricant conduit 128 may have an inlet portion 130 and an outlet portion 132. The inlet portion 130 of the lubricant conduit 128 may extend inward into a body portion 134 from an inner surface 133 of the carrier housing 112, or the inlet portion 130 of the lubricant conduit 128 may extend inward into the body portion 134 of the forward portion 112A of the carrier housing from the inner surface 133 thereof, toward one or more first pinion bearings 136 and/or one or more second pinion bearings 138 providing rotational support for at least a portion of the pinion shaft 116 and/or the pinion gear 106 of the axle assembly 100. In accordance with the embodiment illustrated in FIG. 4 and as a non-limiting example that the outlet portion 132 of the lubricant conduit 128 may be disposed proximate to the one or more first and/or second pinion bearings 136 and/or 138. As a result it is therefore to be understood that the lubricant conduit 128 may be of a size and shape to receive and direct an amount of fluid lubricant to the one or more first and/or second pinion bearings 136 and/or 138. It is within the scope of this disclosure and as a non-limiting example that at least a portion of the outlet portion 132 of the lubricant conduit 128 may be interposed between the one or more first pinion bearings 136 and the one or more second pinion bearings 138 of the axle assembly 100.

According to the embodiment illustrated in FIG. 4 and as a non-limiting example, at least a portion of the heat exchanger 2024 may be received and retained within at least a portion of the lubricant conduit 128 and/or the lubricant catch 126 of the lubricant conduit 128. As best seen in FIG. 4 and as a non-limiting example, the lubricant conduit 128 and/or the lubricant catch 126 may include a heat exchanger receiving portion 140 therein having a size and shape to receive and retain at least a portion of the heat exchanger 2024 therein. It is within the scope of this disclosure and as a non-limiting example that the heat exchanger receiving portion 140 may include a raised platform portion 142 and a complementary recessed portion 144. The recessed portion 144 of the heat exchanger receiving portion 140 may have a wall portion 146 providing a positive stop for the heat exchanger 2024 thereby preventing the heat exchanger 2024 from being inserted into the lubricant conduit 128 beyond a pre-determined point.

The heat exchanger 2024 may comprise an induction heater. In one embodiment, the heat exchanger 2024 includes an induction coil 2026 disposed in a potting material 2028. The potting material 2028 of the heat exchanger 2024 may include a hollow interior portion 2027 therein. As a result, it is within the scope of this disclosure and as a non-limiting example that the potting material 2028 may have a generally hollow cylindrical geometry to accommodate a tube conduit 2030 coaxially disposed therein. The potting material 2028 may comprise any potting compound able to endure the temperatures achieved by the tube conduit 2030 and not corrode in the presence of the lubricant. In one embodiment, the potting material 2028 may comprise a ceramic. The potting material 2028 may be sealed against the lubricant catch 126 or lubricant conduit 128 via an O-ring (not depicted). The tube conduit 2030 comprises a ferromagnetic material. The heat exchanger 2024 is in electrical connection with a controller 2032.

During operation, electrical current is communicated to the induction coil 2026 to produce eddy currents within the tube conduit 2030. The alternating magnetic field within the tube conduit 2030 generates heat within the material thereof. Heat from the tube conduit 2030 is transferred to the lubricant passing therethrough via convective heat transfer.

Ferrous particles produced by normal wear on the axle assembly 100 may be suspended in the lubricant. The ferrous particles may also experience inductive heating when the lubricant flows through the tubular conduit 2030. Heating of the ferrous particles suspended within the lubricant contributes to the warm-up of the lubricant.

Figure 5:
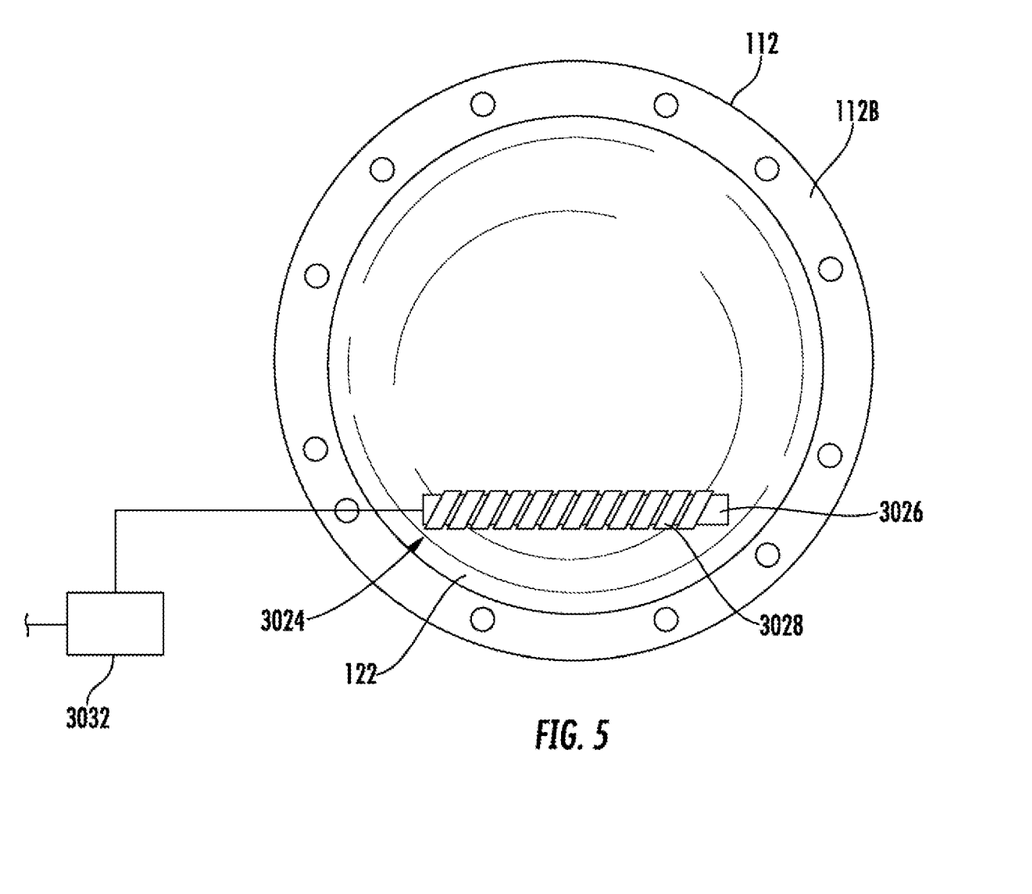
FIG. 5 is a side view of a portion of an axle assembly having a heat transfer system according to still another embodiment of the presently disclosed subject matter.

As illustrated in FIG. 5, in another embodiment, a heat exchanger 3024 may be located in the lubricant sump 122, and coupled with either the carrier housing forward or rearward portions 112A, 112B. The heat exchanger 3024 may comprise an induction heater having a ferromagnetic core 3026 coupled with the interior surface of the carrier housing rearward portion 112B. An induction coil 3028 disposed about the core 2026 receives electrical current to generate heat within the core 2026 as described above. In operation, heat is transferred from the heat exchanger 3024 to the lubricant in the sump 122. The heat exchanger 3024 is in electrical connection with a controller 3032.

Figure 6:
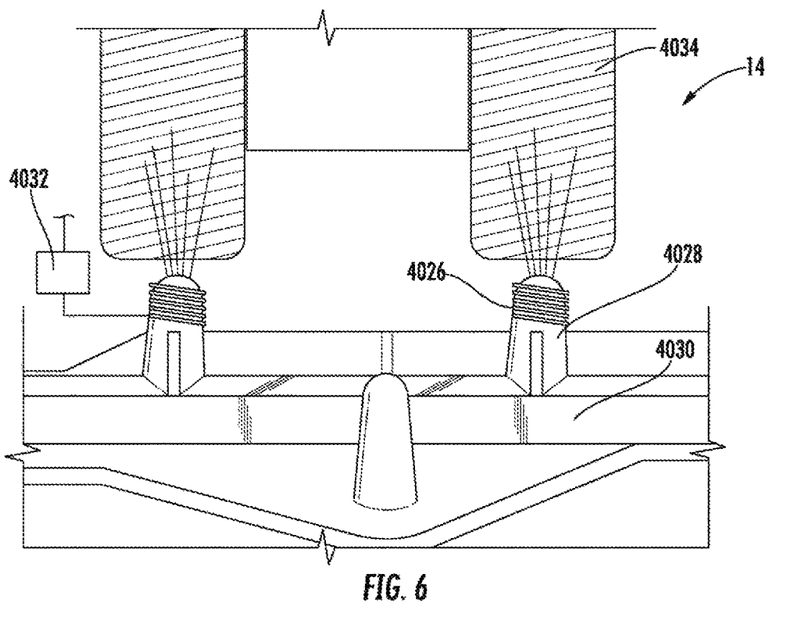
FIG. 6 is a side view of a portion of a gear box having a heat transfer system according to an embodiment of the presently disclosed subject matter.

In another embodiment, as illustrated in FIG. 6, a heat exchanger 4024 may be integrated into the transmission 14 to heat the lubricant therein. The transmission 14 includes a fluid rail 4030 comprising a fluid conduit (not depicted) and at least one nozzle 4028. Pressurized lubricant is ejected from the fluid rail nozzle 4028 onto at least one gear 4034 of the transmission 14. The heat exchanger 4024 is an induction heater comprising an induction coil 4026 disposed about the at least one nozzle 4028. The nozzle 4028 includes at least a portion comprising a ferromagnetic material. Electrical current supplied to the induction coil 4026 generates heat within the material of the nozzle 4028 as described above. Heat is transferred to the lubricant as the lubricant is sprayed out of the heated nozzle 4028. The heat exchanger 4024 is in electrical connection with a controller 4032.

Figure 7:
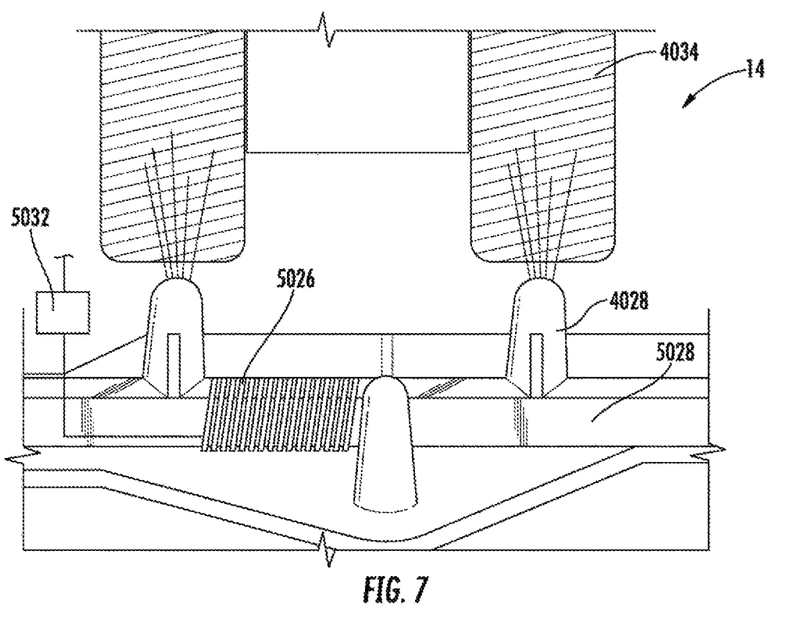
FIG. 7 is a side view of a portion of a gear box having a heat transfer system according to another embodiment of the presently disclosed subject matter.

In still another embodiment, as illustrated in FIG. 7, a heat exchanger 5024 may be integrated into the transmission 14. The heat exchanger 5024 is an induction heater comprising an induction coil 5026 disposed about at least a portion of a fluid rail 5028. The induction coil 5026 generates heat within the fluid rail 5028 or a portion of a manifold thereof. As lubricant flows through the fluid rail 5028, heat is transferred from the fluid rail 5028 to the lubricant. The heat exchanger 5024 is in electrical connection with a controller 5032. Persons skilled in the art will recognize that the heat exchanger 4024 and 5024 may be utilized in any gear box.

As illustrated in FIG. 1, in an embodiment, the heat exchanger 1024 may receive electrical power from a regenerative braking apparatus 1026. Any of the heat exchangers 1024, 2024, 3024, 4024, 5024 may utilize the regenerative braking apparatus 1026 as a power source. The regenerative braking apparatus 1026 includes a generator 1028 for converting kinetic energy from the front or rear axle during deceleration of the vehicle into electrical energy. The generator 1028 is in electrical connection with a controller 1032, 2032, 3032, 4032, 5032 which is in electrical connection with the heat exchanger 1024, 2024, 3024, 4024, 5024. In an embodiment, a battery or capacitor (not depicted) may also be in electrical communication with the controller 1032, 2032, 3032, 4032, 5032.

In another embodiment of the disclosure, the heat exchangers 1024, 2024, 3024, 4024, 5024 may receive electrical power from a solar panel 2025. The solar panel 2025 is in electrical connection with the controller 1032, 2032, 3032, 4032, 5032. In an embodiment, a battery or capacitor (not depicted) may be in electrical connection between the controller 1032, 2032, 3032, 4032, 5032 and the solar panel 2025. The solar panel 2025 may be positioned on an outer surface of the vehicle 1.

In yet another embodiment (not depicted), the heat exchangers 1024, 2024, 3024, 4024, 5024 may receive electrical power from a motor-generator/inverter. The motor-generator is in electrical connection with the controller 1032, 2032, 3032, 4032, 5032. A battery or capacitor (not depicted) may be in electrical connection between the controller 1032, 2032, 3032, 4032, 5032 and the motor-generator. The motor-generator may be utilized as a power source for recharging the battery cells of a hybrid-electric or full electric vehicle. During the warm-up cycle of the axle assembly 10, the electrical energy generated by the motor-generator may be communicated to the heat exchanger 1024, 2024, 3024, 4024, 5024, or to a battery or a capacitor electrically connected thereto.

Figure 8:
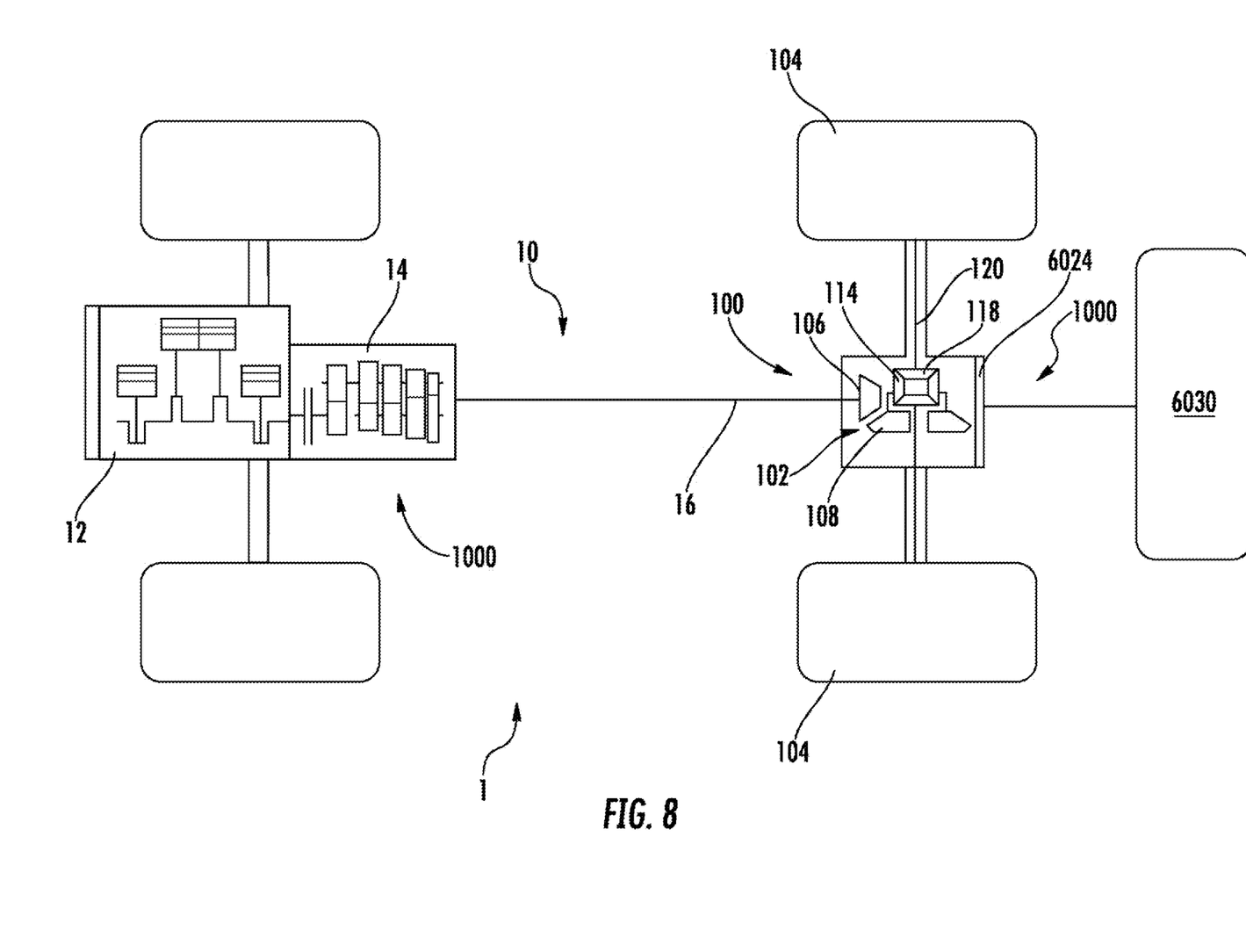
FIG. 8 is a schematic representation of a vehicle having a heat transfer system according to another embodiment of the presently disclosed subject matter.

In still another embodiment, as illustrated in FIGS. 2 and 8, a heat exchanger 6024 may be disposed in the carrier housing 112. In one embodiment, as illustrated in FIG. 2, the heat exchanger 6024 comprise a stacked-plate heat exchanger located axially adjacent to the ring gear 108. As best seen in FIG. 2 and as a non-limiting example, the heat exchanger 6024 is at least partially disposed within said sump and outside the differential case 110. Further, as best seen in FIG. 2 and as a non-limiting example, a longitudinal axis of the heat exchanger 6024 is perpendicular to a longitudinal axis of at least one pinion shaft 116 within the carrier housing 112.

The heat exchanger 6024 includes an inlet 6026 and an outlet 6028 in fluid communication via a fluid conduit (not depicted). As shown in FIG. 2, the inlet 6026 and the outlet 6028 are positioned on a same side of the heat exchanger 6024, the same side opposite to a side facing the ring gear 108. The heat exchanger inlet and outlet 6026, 6028 are in fluid communication with a liquid-cooled battery cooling unit 6030 (see FIG. 8). The battery cooling unit 6030 is a thermal-management apparatus utilized to extract heat from the battery cells of hybrid-electric or full-electric vehicle. Liquid coolant from the battery cooling unit 6030 is circulated through the heat exchanger 6024 via the inlet and outlet 6026, 6028 to transfer heat from the battery cells to the lubricant in the axle assembly 100.

In an embodiment, a thermal sensor (not depicted) disposed in the carrier housing, and in electrical connection with the controller 1030, 2032, 3032 is utilized to determine the temperature of the lubricant in the axle assembly sump 122. Once a predetermined temperature of the lubricant is achieved, the controller 1030, 2032, 3032 ceases to deliver electrical energy to the heat exchanger 1024, 2024, 3024.

While various embodiments have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:

1. A heat transfer system for a vehicle, comprising:
    an axle assembly having a carrier housing, wherein said carrier housing defines a sump;
    a fluid lubricant at least partially disposed within said sump;
    a heat exchanger at least partially disposed within said sump; and a battery cooling unit having a liquid coolant, wherein said liquid coolant is in fluid communication with said heat exchanger.

2. The heat transfer system according to claim 1, wherein said heat exchanger comprises:
at least one fluid conduit;
a fluid inlet in fluid communication with said fluid conduit; and
a fluid outlet in fluid communication with said fluid conduit.

3. The heat transfer system according to claim 2, wherein said fluid inlet is disposed at a first surface of said heat exchanger and said fluid outlet is disposed at a second surface of said heat exchanger, said first and second surfaces are opposite to at least one surface facing said ring gear.

4. The heat transfer system according to claim 2, wherein said liquid coolant from said battery cooling unit is circulated through said heat exchanger via said fluid inlet and said fluid outlet.

5. The heat transfer system according to claim 4, wherein heat from said liquid coolant is transferred to said lubricant via said heat exchanger.

6. The heat transfer system according to claim 1, wherein said heat exchanger comprises:
a stacked-plate heat exchanger.

7. The heat transfer system according to claim 1, wherein the heat exchanger is disposed axially adjacent to a ring gear within said carrier housing.

8. The heat transfer system according to claim 7, wherein said ring gear is coupled to a differential case within said carrier housing, said differential case including one or more pinion gears and one or more side gears; and wherein said heat exchanger is disposed adjacent to said differential case.

9. The heat transfer system according to claim 1, wherein said battery cooling unit extracts heat from one or more battery cells of said vehicle.

10. The heat transfer system according to claim 9, wherein said vehicle is an electric vehicle or a hybrid-electric vehicle.

11. The heat transfer system according to claim 1, wherein said heat exchanger is disposed toward a rearward portion of said carrier housing.

12. The heat transfer system according to claim 1, wherein a longitudinal axis of said heat exchanger is perpendicular to a longitudinal axis of a pinion shaft within said carrier housing.

13. A lubricant heating system for a vehicle, comprising:
an axle assembly having a carrier housing, wherein the carrier housing defines a sump;
a fluid lubricant at least partially disposed within the sump;
a differential case rotatably mounted within the carrier housing;
a heat exchanger at least partially disposed within said sump and outside the differential case; and
a battery cooling unit having a liquid coolant, wherein said liquid coolant is in fluid communication with the heat exchanger.

14. The lubricant heating system of claim 13, wherein the heat exchanger includes at least one fluid conduit; at least one fluid inlet in fluid communication with the fluid conduit; and at least one fluid outlet in fluid communication with the fluid conduit.

15. The lubricant heating system of claim 14, wherein the liquid coolant from the battery cooling unit is circulated through the heat exchanger via the at least one fluid inlet and the at least one fluid outlet.

16. The lubricant heating system of claim 15, wherein the differential case is coupled to a ring gear within the carrier housing, and wherein the heat exchanger is positioned axially adjacent to the ring gear.

17. The lubricant heating system of claim 16, wherein the at least one fluid inlet and the at least one fluid outlet are positioned on a same side of the heat exchanger, the same side opposite to a side facing the ring gear.

18. The lubricant heating system of claim 13, wherein the heat exchanger is a stacked plate heat exchanger.

19. The lubricant heating system of claim 13, wherein the vehicle is an electric vehicle or a hybrid electric vehicle.

20. The lubricant heating system of claim 13, wherein the battery cooling unit extracts heat from one or more battery cells of the vehicle.

* * * * *